United States Patent
Tada et al.

(10) Patent No.: US 6,655,451 B2
(45) Date of Patent: Dec. 2, 2003

(54) HEAT TRANSFER TUBE FOR FALLING FILM TYPE EVAPORATOR

(75) Inventors: Yoshio Tada, Hatano (JP); Chikara Saeki, Hatano (JP); Hiroyuki Takahashi, Hatano (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/166,251

(22) Filed: Jun. 11, 2002

(65) Prior Publication Data

US 2003/0089489 A1 May 15, 2003

(30) Foreign Application Priority Data

Jun. 12, 2001 (JP) ......................................... 2001-177516

(51) Int. Cl.$^7$ ................................................. F28F 1/42
(52) U.S. Cl. .................... 165/179; 165/133; 165/184; 138/38
(58) Field of Search ................................ 165/133, 184, 165/179, 181; 138/38

(56) References Cited

U.S. PATENT DOCUMENTS

| | | | |
|---|---|---|---|
| 5,203,404 A | * | 4/1993 | Chiang et al. ............... 165/133 |
| 5,992,512 A | * | 11/1999 | Tsuri et al. ................... 165/133 |
| 6,056,048 A | * | 5/2000 | Takahashi et al. ........... 165/184 |
| 6,098,420 A | * | 8/2000 | Furukawa et al. ........... 165/133 |
| 6,173,762 B1 | * | 1/2001 | Ishida et al. ................. 165/133 |

FOREIGN PATENT DOCUMENTS

| | | |
|---|---|---|
| JP | 10-318691 | 12/1998 |
| JP | 11-257888 | 9/1999 |
| JP | 2000-193345 | 7/2000 |

* cited by examiner

Primary Examiner—Terrell McKinnon
(74) Attorney, Agent, or Firm—Oblon, Spivak, McClelland, Maier & Neustadt, P.C.

(57) ABSTRACT

A heat transfer tube for a falling film type evaporator, in which water spreading characteristics, particularly the water spreading characteristics in the tube axis direction, enhancing the heat transfer ability. Three types of projections 2, 3, and 4 are formed on an external surface 1a of a heat transfer tube body 1. A respective plurality of projections 2 to 4 are arranged spirally in parallel to one another, forming projection groups 2a to 4a. The number of each projection group 2 to 4 is one. Pitches P2 to P4 for the projections 2 to 4 are in the range of 0.35 mm$\leq$P4<P3<P2$\leq$5.95 mm. Heights h2 to h4 of the projections 2 to 4 are in the range of 0.1 mm$\leq$h4<h3<h2$\leq$0.5 mm. Pitches for the projection groups 2a to 4a is in the range of 0.72 to 1.12 mm.

15 Claims, 9 Drawing Sheets

HEAT TRANSFER TUBE FOR FALLING FILM TYPE EVAPORATOR

BACKGROUND OF THE INVENTION

The present invention relates to a heat transfer tube for a falling film type evaporator in which refrigerant flows onto the tube external surface to form a liquid film and evaporates so that heat is exchanged between the refrigerant and a fluid flowing through the tube.

An absorption chiller/heater is a refrigeration cycle system including an absorber in which absorbent (e.g., lithium bromide aqueous solution) absorbs vapor of a refrigerant (e.g., water), a generator that separates the vapor of a refrigerant from the absorbent, a condenser that condenses the separated refrigerant vapor, and an evaporator in which the condensed refrigerant evaporates to exchange heat. The absorption chiller/heater uses no refrigerant with a high global warming potential, such as chlorofluorocarbon.

Recently, the environmental destruction has been seriously concerned. Accordingly, the absorption chiller/heater has been developed and become widely used as an environment-friendly refrigeration cycle system for large buildings and an air conditioning system for local areas, because the absorption chiller/heater realizes a high heat efficiency without chlorofluorocarbon refrigerant that has both a high heat exchange ability and a high global warming potential. Thus, a high efficient heat transfer tube, the most important member of the absorption chiller/heater, is now strongly required.

In a falling film type evaporator such as the absorption type water cooling/heating equipment, many heat transfer tubes are provided so that their tube axes are in parallel to one another inside the evaporator body having low internal pressure. A refrigerant (e.g., water) flows onto the tube surfaces, and a heat exchange between the refrigerant and a fluid (e.g., water) flowing through the tubes is done, so that the fluid through the tubes is chilled. The refrigerant in contact with the tubes flows over the tube external surfaces. Then, the refrigerant evaporates to take away the heat of the tube external surfaces because of the low internal pressure, so that the fluid through the tubes is chilled.

A high efficient heat transfer tube needs a larger contact area between a refrigerant and a tube, namely, a larger heat exchange area. Therefore, water spreading characteristics of the refrigerant on the tube external surface need to improve.

A heat transfer tube having a plurality of projections spirally arranged on its external surface has been disclosed in JP10318691, as one example of the above described heat transfer tube for a falling film type evaporator. This heat transfer tube comprises a tube body, fins which are provided on the tube external surface and extend in a direction perpendicular to or oblique to the tube axis, and notches which extend in a direction cross to the fins and cut the fins. The depth of the notches is substantially the same as the height of the fins. The notches cut the fins to form a plurality of projections. The height of the projections is in the range of 0.2 to 0.4 mm, and the pitch between adjacent projections is in the range of 0.5 to 0.9 mm. Therefore, the water spreading characteristics of the heat transfer tube can improve compared to a smooth bore tube not having projections, and the heat transfer ability can relatively improve because the tube external surface area increases.

However, the prior art has the following disadvantages. In the heat transfer tube for a falling film type evaporator disclosed in JP10318691, the tube external surface area increases, but the water spreading characteristics on the external surface is not sufficient. Accordingly, in an evaporator in which a plurality of heat transfer tubes is arranged so that their tube axis directions are in parallel to one another, refrigerant flowing onto a top portion of the external surface of the most upper tube tends to drop in the tube circular direction before flowing in the tube axis direction. The refrigerant on the top portion of the tube external surface drops almost vertically in the tube circular direction, and then drips from a bottom portion of the tube external surface onto the next heat transfer tube. Flow of the refrigerant on the tube external surface always follows a fixed pattern, and the refrigerant always drips from an upper tube onto a fixed area of the next tube. This means that areas that the refrigerant does not reach always exist on the external surfaces of the heat transfer tubes provided inside the evaporator. As a result, a heat transfer ability of the heat transfer tubes decreases because such areas do not contribute to a heat exchange between the refrigerant and the fluid through the tubes.

SUMMARY OF THE INVENTION

The present invention aims at solving the above-described problems. The object of the present invention is to provide a heat transfer tube for a falling film type evaporator, in which water spreading characteristics of refrigerant on an external surface of the tube, especially water spreading characteristics in the tube axis direction, improve to enhance a heat transfer ability.

In one aspect, a falling film type heat transfer tube used for exchanging heat between a liquid film formed by a liquid dripping onto the tube external surface and a fluid flowing through the tube, comprises a tube body, a plurality of separate projections formed on an external surface of the tube, and a ridge which is formed in a convex shape on an internal surface of the tube and spirally extends. The projections are divided into a plurality of projection groups. In each projection group, a plurality of uniform shaped projections is spirally arranged so that the pitches between adjacent projections are uniform. The projection groups are arranged in parallel to one another. A shape of or pitch for the projections forming at least one projection group is different from the shapes of or pitches for the projections forming the other projection groups.

In the above-described structure, surface intension on each projection group is different from each other, so that refrigerant flows from one projection group to the other projection groups. The refrigerant becomes easy to flow in the tube axis direction, and the heat transfer area increases. The refrigerant drips onto various positions on a next heat transfer tube, and the heat transfer area of the next heat transfer tube also increases. Additionally, the refrigerant flows in the tube axis direction, so that the pattern when the refrigerant drips from the bottom portion of the tube is not fixed. Thus, the heat transfer area of the next heat transfer tube increases. As a result, the heat transfer area of each heat transfer tube becomes hard to dry, enhancing the ability for a heat transfer device.

In another aspect, in the falling film type heat transfer tube of the present invention, it is preferable that the shapes of all the projections are truncated quadrilateral pyramids or quadrilateral pyramids. Portions parallel to the tube axis direction increase because of the quadrilateral shaped projections. Therefore, the water spreading characteristics improve because a ratio of the amount of refrigerant flowing in the tube axis direction to the amount of refrigerant flowing in the tube circular direction increases. The thickness of a liquid film formed around pyramid shaped projections decreases compared to a columnar projection. As a result, the liquid film of refrigerant causes less prevention of heat transfer, enhancing heat transfer ability.

In another aspect, in the falling film type heat transfer tube of the present invention, three projection groups can be provided. A first projection group comprised of first projections, a second projection group comprised of second projections, and a third projection group comprised of third projections are arranged in the tube axis direction in the mentioned order.

In another aspect, the height of the first projection can be the same as that of the second projection, and higher than that of the third projection. The pitch between adjacent first projections can be the same as the pitch between adjacent second projections, and longer than the pitch between adjacent third projections. The refrigerant flows from the higher first and second projection groups to the lower third projection group, enhancing the water spreading characteristics of the refrigerant. Additionally, the refrigerant drips onto various positions on a next heat transfer tube. The refrigerant becomes easy to flow from the area of higher projections to the area of lower projections by setting the pitches between adjacent higher projections longer. As a result, the refrigerant becomes easy to flow in the tube axis direction, enhancing the water spreading characteristics.

In another aspect, the height of the first projection can be the same as that of the second projection, and lower than that of the third projection. The pitch between adjacent first projections can be the same as the pitch between adjacent second projections, and shorter than the pitch between adjacent third projections. The refrigerant flows from the higher third projection group to the lower first and second projection groups, enhancing the water spreading characteristics of the refrigerant. Additionally, the refrigerant drips onto various positions on a next heat transfer tube.

In another aspect, the height of the first projection can be higher than that of the second projection, and the height of the second projection can be higher than that of the third projection. The pitch between adjacent first projections can be longer than the pitch between adjacent second projections, and the pitches between adjacent second projections can be longer than the pitch between adjacent third projections. As a result, the refrigerant flows from the highest first projection group, via the second projection group, to the lowest third group, enhancing the water spreading characteristics of the refrigerant. Additionally, the refrigerant drips onto various positions on a next heat transfer tube.

In another aspect, in the falling film type heat transfer tube of the present invention, all pitches between adjacent projections of one projection group are preferably in the range from 0.35 to 0.95 mm.

In another aspect, in the falling film type heat transfer tube of the present invention, the heights of all the projection are preferably in the range from 0.1 to 0.5 mm.

In another aspect, in the falling film type heat transfer tube of the present invention, the pitch in the tube axis direction between adjacent projection groups is preferably in the range from 0.72 to 1.12 mm.

In another aspect, in the falling film type heat transfer tube of the present invention, the height of the ridge is preferably in the range from 0.15 to 0.45 mm.

In another aspect, in the falling film type heat transfer tube of the present invention, the angle between the extending direction of the ridge and the tube axis direction is preferably in the range from 20 to 45 degrees.

Other and further objects, features and advantages of the invention will appear more fully from the following description.

DETAILED DESCRIPTION OF THE PREFERRED EMBODIMENTS

Figure 1:
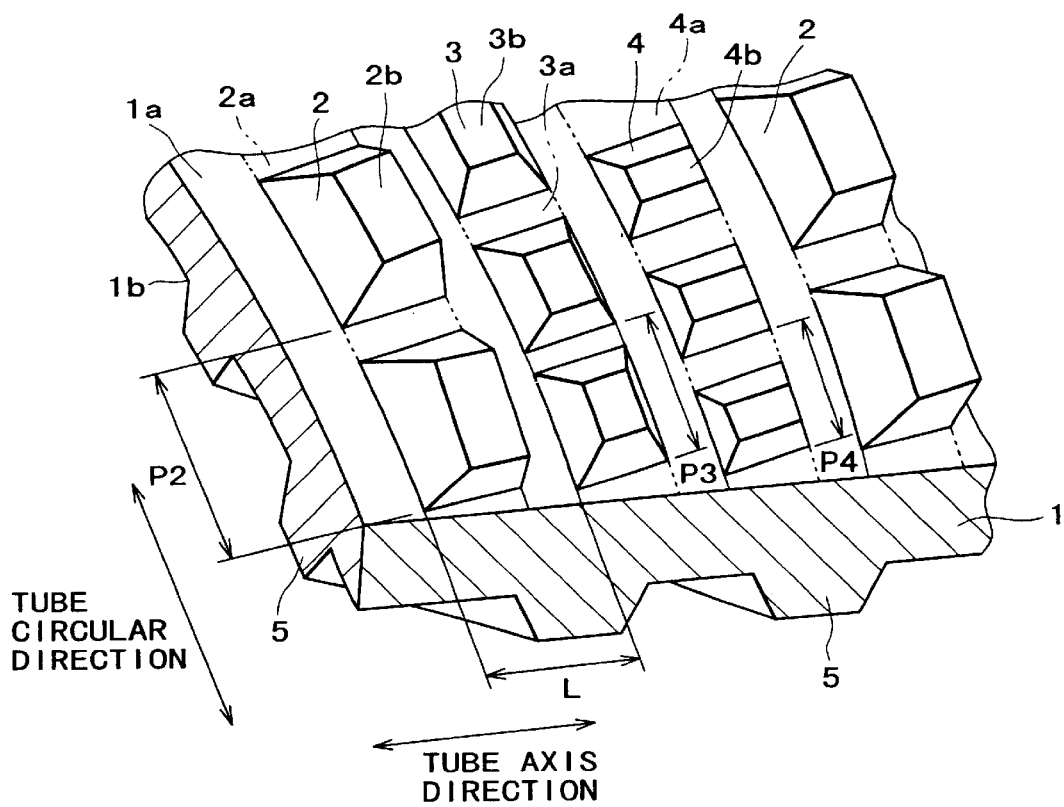
FIG. 1 is a fragmentary view that shows a structure of a heat transfer tube for a falling film type evaporator according to the present invention.
Figure 2:
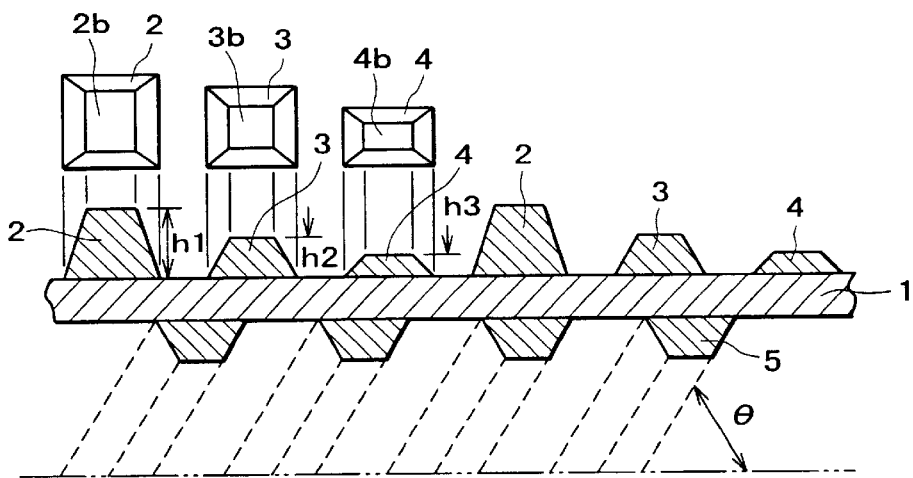
FIG. 2 is a cross sectional view in parallel to the tube axis direction, showing a structure of the heat transfer tube according to the present invention.

The embodiments of the present invention will be described in detail in the following with reference to the appended drawings. FIG. 1 is a fragmentary view showing a structure of a heat transfer tube for a falling film type evaporator (hereinafter called a heat transfer tube) according to the present embodiments. FIG. 2 is a sectional view of the transfer tube structure in parallel to the tube axis direction. As shown in FIG. 1, the heat transfer tube according to the present embodiments comprises a tube body 1 made of copper or copper alloy. Three types of projections 2, 3, and 4 are formed on an external surface 1a of the tube body 1. A plurality of the projections 2 is spirally arranged on the external surface 1a to form a projection group 2a. A plurality of the projections 3 is spirally arranged on the external surface 1a to form a projection group 3a. A plurality of the projections 4 is spirally arranged on the external surface 1a to form a projection group 4a. Three each of the projection groups 2a to 4a are provided on the external surface 1a. The projection groups 2a to 4a are arranged in parallel to one another, and oblique to a direction perpendicular to the tube axis. In other words, the projection group 2a starts from a position on the top of the tube, goes around the periphery, and reaches another position on the top of the tube. Between these two positions, there is a gap in the tube axis direction, where one projection group 3a and one projection group 4a exist. Each pitch (L) in the tube axis direction for the arrangement of the projection groups 2a, 3a, and 4a is in the range from 0.72 to 1.12 mm.

As shown in FIG. 1, P2 is a pitch between adjacent projections 2 of the projection groups 2a, P3 is a pitch between adjacent projections 3 of the projection groups 3a, and P4 is a pitch between adjacent projections 4 of the projection groups 4a. The pitch P2 is longer than the pitch P3, and the pitch P3 is longer than the pitch P4. The respective pitches P2 to P4 are in the range from 0.35 to 0.95 mm. An inequality, 0.35 mm $\leq$P4<P3<P2<0.95 mm, is established.

An area of a top surface 2b of the projection 2 is S2, an area of a top surface 3b of the projection 3 is S3, and an area of a top surface 4b of the projection 4 is S4. An inequality, S4<S3<S2, is established. In the present embodiments, ratios S3/S2 and S4/S3 each are equal to or greater than 0.3 and less than 1.0.

As shown in FIG. 2, the heights of the projections 2 to 4 are called h2 to h4, respectively. Each of the heights h2 to h4 is in the range from 0.1 to 0.5 mm. The height h2 is greater than the height h3, and the height h3 is greater than h4. An inequality, 0.1 mm<h4<h3<h2$\leq$0.5 mm, is established. In the present embodiments, each ratios (h4/h2) and (h3/h2) is equal to or greater than 0.6 and less than 1.0.

As shown in FIGS. 1 and 2, an internal surface 1b of the tube body 1 is provided with a spirally expanding ridge 5. A height of the ridge 5 is in the range from 0.15 to 0.45 mm. On the internal surface of the tube body 1, an angle θ between a line parallel to the tube axis and the extending direction of the ridge 5 is in the range from 20 to 45 degrees.

In the heat transfer tube of the present embodiments, refrigerant flows from the projection group 2a comprised of the higher projections 2, via the projection group 3a, to the projection group 4a comprised of the lower projections 4 because the heights of and pitches for the projections 2 to 4 on the external surface 1a are different from one another. Thus, the water spreading characteristics improve, and the refrigerant drips onto various positions. Additionally, fluid flowing through the tube flows up to the top of the internal surface because of the provision of the ridge 5. As a result, excellent heat transfer ability can be obtained.

Reasons for the above-described numeric settings for the requirements of the present invention will be described in the following.

In the Case that the Pitch Between Adjacent Projections is in the Range from 0.35 to 0.95 mm.

When the pitch between adjacent projections of each projection group is less than 0.35 mm, since fewer refrigerants are introduced between the projections by the surface tension of the refrigerant, a film thickness of the refrigerant on the projections becomes thick, lowering water spreading characteristics. Otherwise, when the pitches is greater than 0.95 mm, since the number of the projections decreases, the external surface area of the heat transfer tube decreases, and thereby the water spreading characteristics decrease. Therefore, the pitch is preferably in the range from 0.35 to 0.95 mm, and more preferably from 0.5 to 0.9 mm.

In the Case that the Height of the Projection is in the Range from 0.1 to 0.5 mm.

When the height of the projections is less than 0.1 mm, since fewer refrigerants are introduced between the projections by the surface tension of the refrigerant, the water spreading characteristics lower and the external surface area of the heat transfer tube decreases. When the height of the projections is higher than 0.5 mm, the film thickness of the refrigerant between the projections becomes thick, and the refrigerant becomes hard to flow over the projections, lowering the water spreading characteristics of the refrigerant. Therefore, preferable height of the projection is in the range from 0.1 to 0.5 mm, and more preferable height is in the range from 0.2 to 0.4 mm.

In the Case that Pitch in the Tube Axis Direction Between the Adjacent Projection Groups is Greater than 0.72 mm, and less than 1.12 mm.

When pitch in the tube axis direction between the adjacent projection groups is less than 0.72 mm, the refrigerant becomes hard to flow between the projections, the water spreading characteristics on the external surface of the heat transfer tube decreases, and thus the heat transfer ability of the heat transfer tube lowers. Otherwise, when the pitch between the adjacent projection groups is greater than 1.12 mm, the refrigerant becomes too easy to flow between the projections, so that wetting and flowing of the refrigerant in the tube axis direction are prevented. Therefore, preferable pitch between the adjacent projection groups is in the range from 0.72 to 1.12 mm. The pitch of 0.72 to 1.12 mm is also preferable for machining the tube.

In the Case that Height of a Ridge is in the Range from 0.15 to 0.45 mm.

In a heat transfer tube, a higher ridge can enhance the heat transfer ability. When a height of the ridge is less than 0.15 mm, the ridge cannot contribute to the enhancement efficiently. Otherwise, when the height of the ridge is greater than 0.45 mm, the enhancement of the heat transfer ability becomes inefficient, and the pressure drop of water flowing through the tube becomes large. Therefore, preferable height of the ridge is in the range from 0.15 to 0.45 mm.

In the Case that an Angle Between the Extending Direction of the Ridge and the Tube Axis Direction.

A larger angle (lead angle) between the extending direction of the ridge and the tube axis direction enhances the heat transfer ability. When the lead angle is less than 20 degrees, it is not sufficient for the enhancement. Otherwise, when the lead angle is over 45 degrees, the pressure drop of water flowing through the tube becomes large. Therefore, preferable lead angle is in the range from 20 to 45 degrees.

Figure 3:
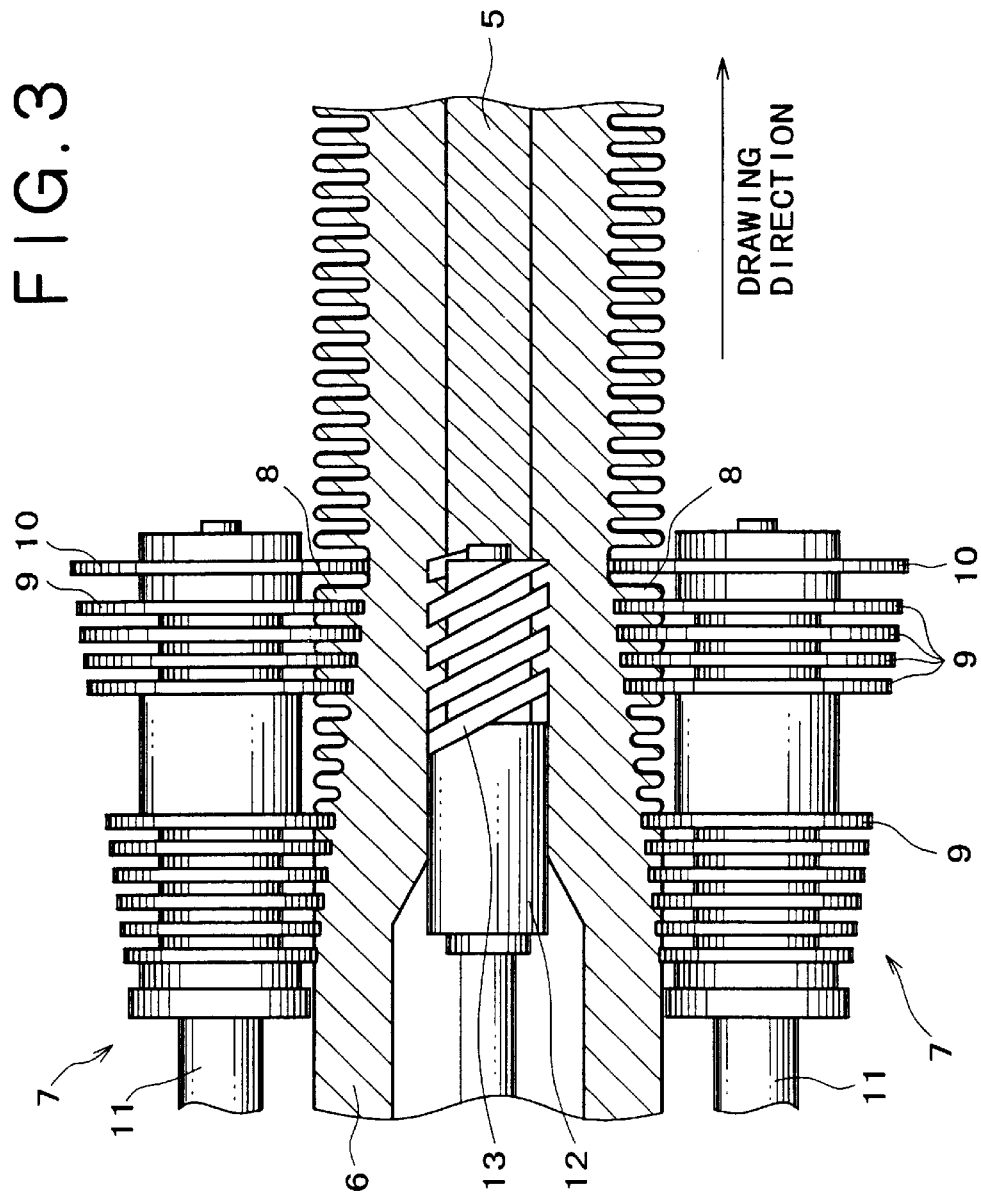
FIG. 3 is a cross sectional view of a method for producing the heat transfer tube according to the present invention.

Next, a method for producing the heat transfer tube according to the present embodiments will be described in the following. FIG. 3 is a cross sectional view of a method for producing the heat transfer tube according to the present embodiment. Three disks 7 are positioned on an external surface of a raw tube 6 made of copper or copper alloy. Each disk 7 is positioned, for example, at 120 degree interval around the tube's diameter. FIG. 3 shows only two of the three disks 7. Each disk 7 is provided with, for example, ten disk blades 9 that form fins 8 on the raw tube 6, and one disk blade 10 that cuts the fins 8 to form separate projections. Each of the disk 7 is supported axially by an arbor 11 to rotate on its axis. A grooved mandrel 12 is inserted inside the raw tube 6. A groove 13 is formed on the external surface of the internal grooved mandrel 12.

As shown in FIG. 3, as the three disks 7 and the grooved mandrel 12 rotate on their axes, the raw tube 6 is pulled out in the form rolling direction. The disk blades 9 of each disk 7 are pressed on the external surface of the raw tube 6 to form three start fins 8. Additionally, the disk blades 10 of each disk 7 are pressed on the fins 8, so that notches are formed on the fins 8. Accordingly, three projection groups each arranged in a line are formed with three start fins 8. In addition, the grooved mandrel 12 is pressed on the internal surface of the raw tube 6 to form a spirally extending ridge 5. Through the above-described process, the heat transfer tube of the present embodiments is produced.

It should be understood that the present invention is not intended to be limited to the above-described embodiments, in which the projection shapes are truncated quadrilateral pyramids. For example, the projection shapes of the present invention can be quadrilateral pyramids, cylinders, cones, and prisms and pyramids which do not employ quadrilaterals.

Exemplary Embodiments

Figure 4:
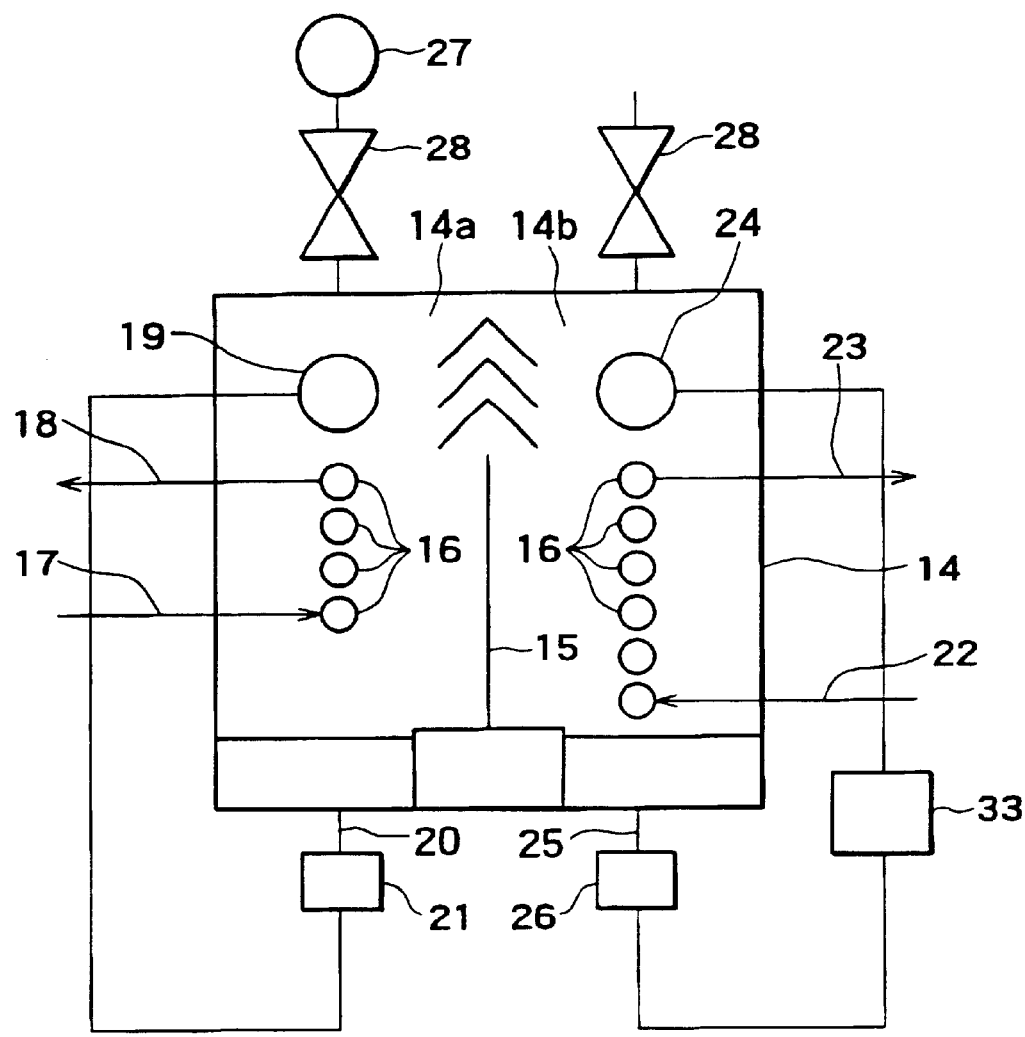
FIG. 4 is a diagram of a structure of a test apparatus used for an ability evaluation of the heat transfer tube.

In the following, effects of the embodiments of the present invention are described in detail in comparison with the examples outside the scope of the claims of the present invention. First, experiment methods common in the following experiments are explained. A method of measuring an overall heat transfer coefficient of a heat transfer tube is used for indicating the heat exchanging ability. FIG. 4 is a diagram which shows a structure of an test apparatus used in an ability evaluating experiment for the heat transfer tube according to the embodiments of the present invention and their comparative examples.

The test apparatus of the FIG. 4 is provided with a chamber 14, the inside of which is divided into an evaporator 14a and an absorber 14b using a wall 15. Vapor can move over the wall 15. In the evaporator 14a, six heat transfer tubes 16 are arranged vertically so that each heat transfer tube 16 is horizontal and in parallel to one another. The heat transfer tubes 16 are connected in series, the lower end of which is connected to a cooling water inlet 17 and the upper end of which is connected to a chilled water outlet 18. A refrigerant inlet 19 from which refrigerant flows down is provided immediately above the heat transfer tubes 16. A refrigerant outlet 20 is provided on a bottom of the evaporator 14a. The refrigerant outlet 20 is connected to the refrigerant inlet 19 via a refrigerant pump 21.

In the absorber 14b, like the evaporator 14a, six heat transfer tubes 16 are connected in series, one end of which is connected to a cooling water inlet 22 and the other end of which is connected to a chilled water outlet 23. An LiBr solution inlet 24 is provided immediately above the connected heat transfer tubes 16. An LiBr solution outlet 25 is provided on a bottom of the absorber 14b. The LiBr solution outlet 25 is connected to the LiBr solution inlet 24 via an LiBr aqueous solution pump 26 and a generator 33 that separates water from LiBr solution. The chamber 14 is provided with a pressure transducer 27 and a valve 28 through which gas in the chamber 14 is discharged.

In the evaporator 14a, chilled water is introduced into the heat transfer tubes 16 through the cooling water inlet 17 and discharged through the chilled water outlet 18. The refrigerant flows down onto the external surface of the heat transfer tubes 16 from the refrigerant inlet 19. Water was used as the refrigerant. Then, the refrigerant flows on the external surface of the most upper tube of the heat transfer tubes 16 and drips onto the external surface of the next tube. The refrigerant flows sequentially over the external surfaces of the heat transfer tubes 16 in multiple tube passes. In this process, the refrigerant and the chilled water in the heat transfer tubes 16 exchange heat. Then, part of the refrigerant, in a state of liquid, drops from the most lower tube of the heat transfer tubes 16 onto the bottom of the evaporator 14a, and the remaining refrigerant evaporates and moves to the absorber 14b over the wall 15. The refrigerant that has dropped onto the bottom of the evaporator 14a goes out from the refrigerant outlet 20 to the outside of the evaporator 14a, rises up to the refrigerant inlet 19 using the refrigerant pump 21, and again flows down onto the surfaces of the heat transfer tubes 16.

In the absorber 14b, chilled water enters the heat transfer tubes 16 through the cooling water inlet 22, and is discharged through the chilled water outlet 23. The LiBr solution flows onto the external surface of the heat transfer tubes 16 through the LiBr solution inlet 24. In the process that the LiBr solution flows over the external surfaces of the heat transfer tubes 16, the LiBr solution absorbs the refrigerant introduced from the evaporator 14a. A concentration of the LiBr solution is about 63 mass % at the LiBr solution inlet 24. When the concentration is higher than 63 mass %, the LiBr solution crystallizes. While dripping, the LiBr solution absorbs the refrigerant (water). Therefore, the concentration of the LiBr solution is 55 to 60 mass % near the LiBr solution outlet 25. After dropping onto the bottom of the absorber 14b, the LiBr solution flows into the generator 33 through the LiBr solution outlet 25 using the LiBr aqueous solution pump 26, and then is drawn up to the LiBr solution inlet 24.

The heat transfer ability of each heat transfer tube was evaluated using a test apparatus of FIG. 4. A table 1 shows the experiment conditions. An overall heat transfer coefficient $K_0$ was calculated based on the following equations using measurement values obtained under the conditions. In the equations, $K_0$ is an overall heat transfer coefficient (kw/m²K); Q is a heat transfer quantity of an evaporator (kw); $\Delta T_m$ is an logarithmic mean temperature difference (° C.); $A_0$ is a nonstandard external area at ends of a heat transfer tube (m²); G is an chilled water flow rate (kg/h); $C_p$ is a specific heat of chilled water (kJ/kg/K); $T_{in}$ is a temperature at cooling water inlet (° C.); $T_{out}$ is a temperature at chilled water outlet (° C.); $T_e$ is an evaporation temperature of refrigerant (° C.); $D_0$ is an external diameter of ends of the heat transfer tube; L is the effective length of the heat transfer tube (m); and N is the number of the heat transfer tubes.

TABLE 1

| | |
|---|---|
| Evaporation Pressure (Pa) | 800 |
| Refrigerant Flow Amount (kg/m/min) | 0.75, 1.00, 1.25 |

TABLE 1-continued

| | |
|---|---|
| Water velocity (m/s) | 1.50 |
| Chilled water Outlet Temperature (° C.) | 7.0 |
| Layout of the tubes | 1 row × 4 stages (Stage Pitch 24 mm) |
| The Number of Tube Passes | 4 |

$$K_0 = \frac{Q}{(\Delta T_m \times A_0)} \quad \text{(Equation 1)}$$

$$Q = G \times C_p \times (T_{in} - T_{out}) \quad \text{(Equation 2)}$$

$$\Delta T_m = \frac{T_{in} - T_{out}}{\ln\left(\frac{T_{in} - T_e}{T_{out} - T_e}\right)} \quad \text{(Equation 3)}$$

$$A_0 = \pi \times D_0 \times L \times N \quad \text{(Equation 4)}$$

Figure 5:
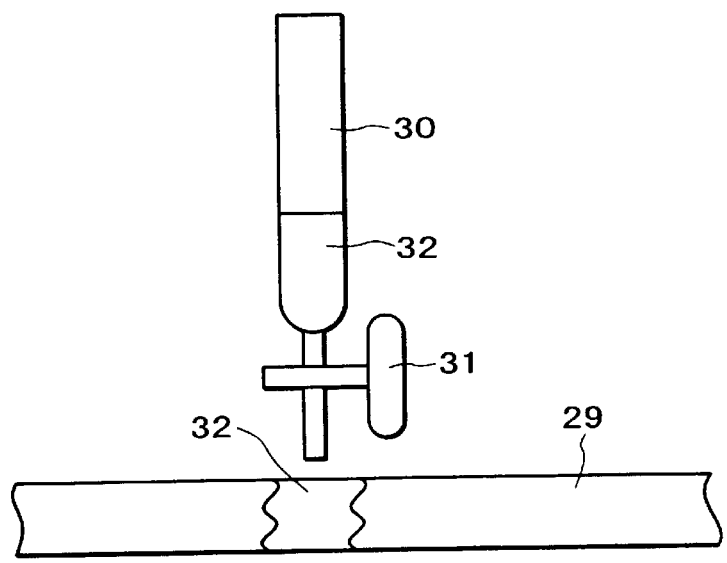
FIG. 5 is a diagram that shows a structure of a test apparatus measuring water spreading characteristics of the heat transfer tube.

A method of evaluating water spreading characteristics will be described in the following. FIG. 5 is a diagram of a structure of a test apparatus measuring water spreading characteristics. The test apparatus is provided with a heat transfer tube 29 which is kept horizontal and a pipette 30 from which stained water 32 drips onto an external surface of the heat transfer tube 29. The pipette 30 is provided with a tuning knob 31. The lower end of the pipette 30 is positioned 20 mm above a top of the middle portion of the tube in the tube axis direction. First, ultrasonic cleaning with acetone was done for five minutes to remove fat on the surface of the heat transfer tube 29. The stained water 32 of 2 ml dripped from the pipette 30 onto the external surface of the horizontally positioned heat transfer tube 29 by tuning the control valve 31.

Figure 6:
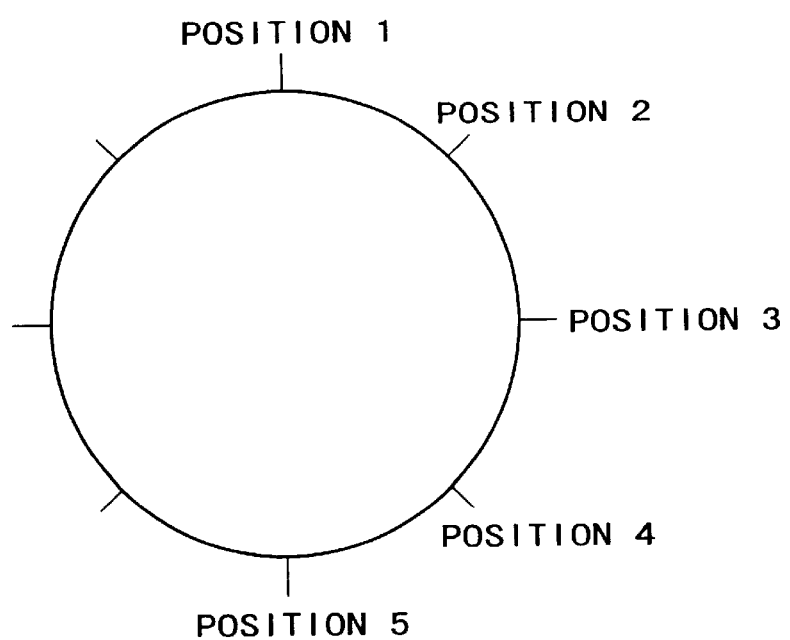
FIG. 6 is a sectional view perpendicular to the tube axis, indicating measurement points for measuring the water spreading characteristics on the heat transfer tube.

Then, the water spreading characteristics of the stained water 32 on the external surface of the heat transfer tube 29 was evaluated. FIG. 6 is a cross section diagram perpendicular to the tube axis, showing measurement points at which the water spreading characteristics on the heat transfer tube 29 are measured. A measurement point 1 is placed on the tube top, and a measurement point 5 is placed on the tube bottom. Between the measurement points 1 and 5, measurement points 2 to 4 are sequentially placed at uniform intervals beginning from the upper portion. The water spreading characteristics of the stained water 32 were measured at the five measurement points of FIG. 6 uniformly placed in the tube circular direction.

A heat transfer tube having three types (projections A, B, and C) of spirally arranged projections on its external surface, a heat transfer tube having two types (projections A, B, and B) of spirally arranged projections on its external surface, and a heat transfer tube having one type of spirally arranged projections on its surface, and a smooth bore tube having no projection on its external surface were used as the experiment materials. Table 2 shows the heights and pitches (pitches) in the spiral direction of the respective projections A, B, and C. The external diameter of these heat transfer tubes before machined was 16 mm. The external diameter of the grooved heat transfer tubes was 15.4 mm, the wall thickness was 0.54 mm, the pitch in the tube axis direction between the adjacent projection groups was 0.97 mm, the height of the ridge was 0.30 mm, and the lead angle of the ridge was 43 degrees.

TABLE 2

| Projection | Height (mm) | Pitch (mm) |
|---|---|---|
| A | 0.39 | 0.71 |
| B | 0.36 | 0.60 |
| C | 0.29 | 0.49 |

Exemplary Embodiment 1

Figure 7:
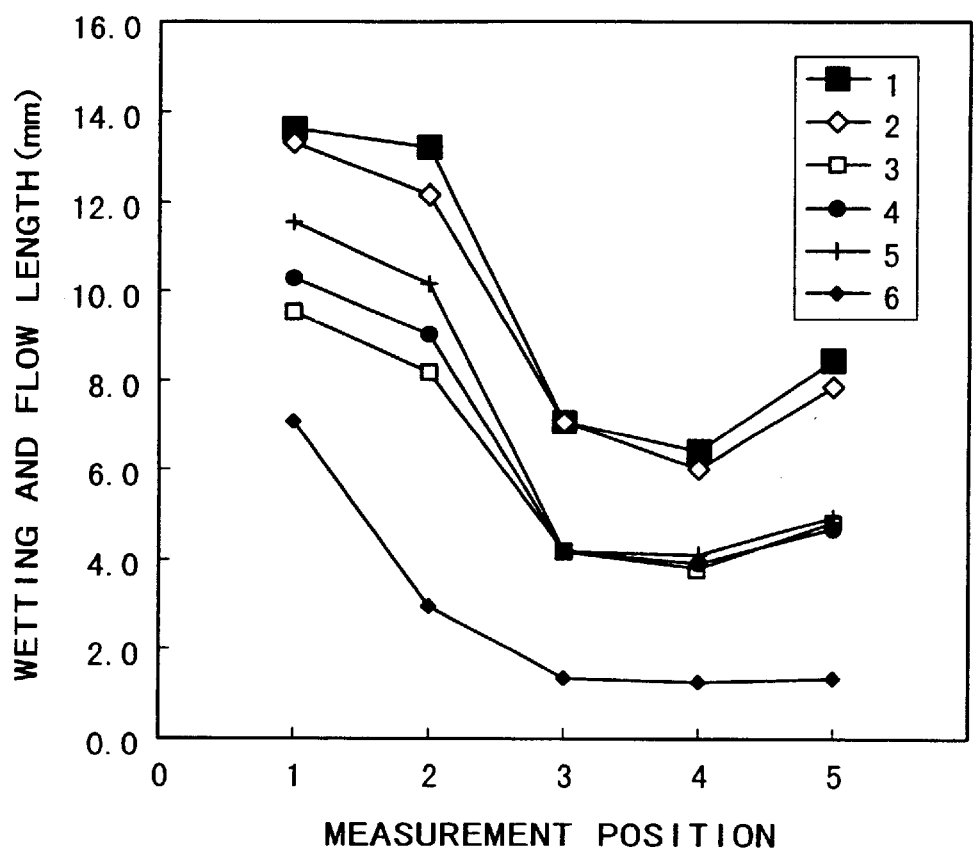
FIG. 7 is a graph that shows the relationship between an external shape and water spreading characteristics of the heat transfer tube, where the horizontal scale label indicates the measuring positions and the vertical scale label indicates the wetting and flow length.
Figure 8:
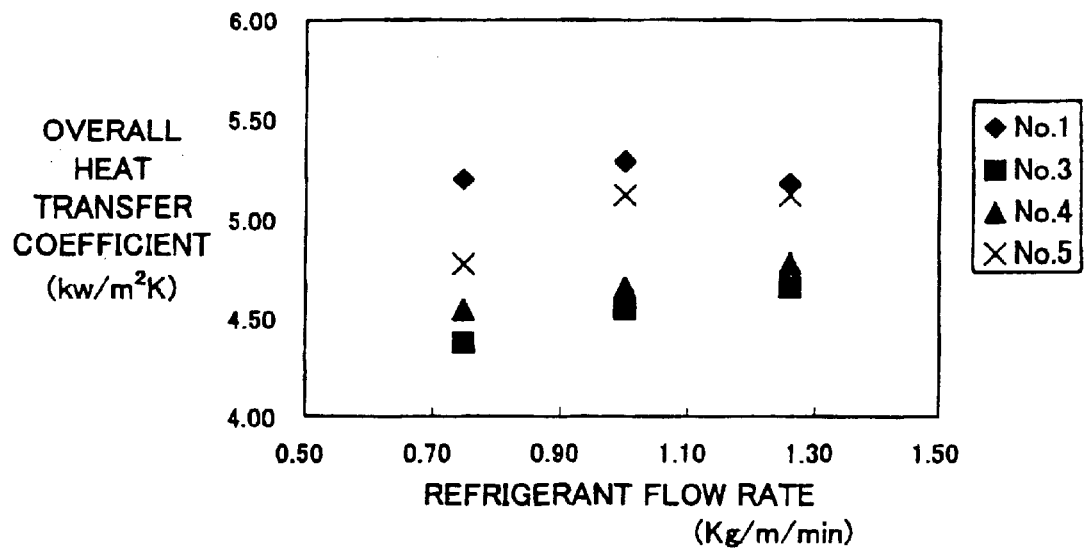
FIG. 8 is a graph that shows the relationship between the external shape and overall heat transfer coefficient of the heat transfer tube, where the horizontal scale label indicates the refrigerant flow rate and the vertical scale label indicates the overall heat transfer coefficient.
Figure 9:
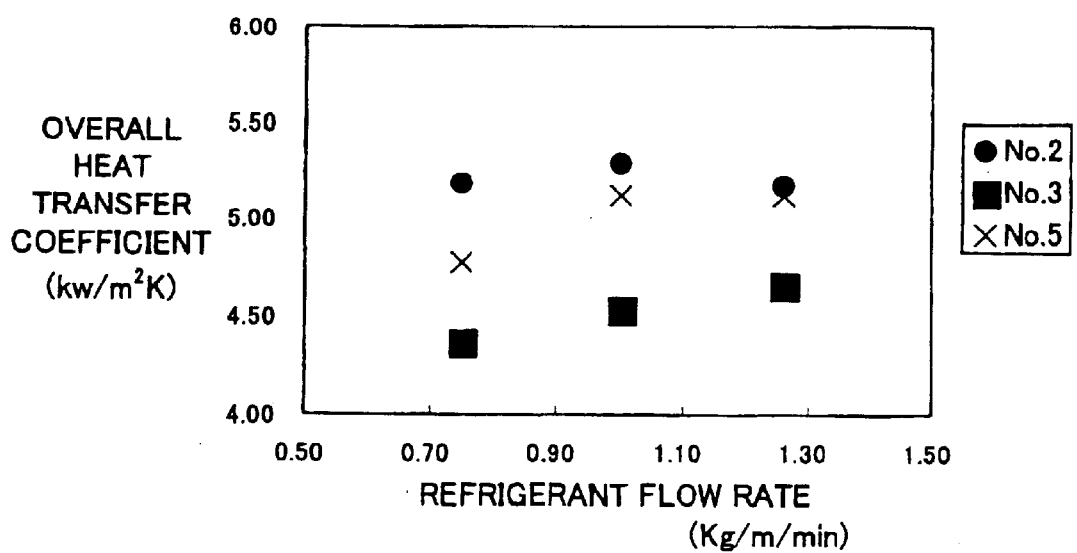
FIG. 9 is a graph that shows the relationship between the external shape and overall heat transfer coefficient of the heat transfer tube, where the horizontal scale label indicates the refrigerant flow rate and the vertical scale label indicates the overall heat transfer coefficient.

A heat transfer tube having three different types of spirally arranged projections on its external surface (hereinafter, a sample No. 1), and a heat transfer tube having two different types of spirally arranged projections on its external surface (hereinafter, a sample No. 2) were used as the samples. Three types of heat transfer tubes each having one type of projections (hereinafter, comparative examples Nos. 3 to 5) on its external surface were used as the comparative examples. Further, a smooth bore tube having no projection on its surface (hereinafter, a comparative example 6) was used. The water spreading characteristics and overall heat transfer coefficients of the samples 1 to 2 and of the comparative examples 3 to 6 were evaluated. Table 3 and FIG. 7 show the result of the evaluation for the water spreading characteristics. FIG. 7 is a chart showing the relationship between the external shapes and water spreading characteristics of the heat transfer tubes, where the horizontal scale label indicates measurement points and the vertical scale label indicates wetting and flow lengths. Table 4 and FIGS. 8 and 9 show the result of the evaluation for the overall heat transfer coefficient. FIGS. 8 and 9 are charts showing the relationship between the external shape and overall heat transfer coefficients of the heat transfer tubes, where the horizontal scale label indicates refrigerant flow rate and the vertical scale label indicates overall heat transfer coefficients. Projections "A, B, C" of Tables 3 and 4 means the shape of the external surface on which three rows of the respective projections A to C are arranged. Projections "A, B, B" means the shape of the external surface on which two rows of the projection B are arranged next to the row of the projections A.

TABLE 3

| | Example | | Comparative example | | | |
|---|---|---|---|---|---|---|
| No. | 1 | 2 | 3 | 4 | 5 | 6 |
| Projection | (A, B, C) | (A, B, B) | (A) | (B) | (C) | (Smooth bore tube) |
| Measurement point | | | | | | |
| 1 | 13.6 | 13.2 | 9.6 | 10.3 | 11.5 | 7.1 |
| 2 | 13.2 | 12.2 | 8.2 | 9.0 | 10.1 | 3.0 |
| 3 | 7.0 | 7.0 | 4.2 | 4.2 | 4.2 | 1.4 |
| 4 | 6.4 | 6.0 | 3.8 | 3.9 | 4.1 | 1.3 |
| 5 | 8.5 | 7.8 | 4.8 | 4.7 | 4.9 | 1.4 |
| Average Value | 9.7 | 9.2 | 6.1 | 6.4 | 7.0 | 2.8 |

TABLE 4

| Example No. | Projection | Refrigerant flow rate (kg/m/min) | | |
|---|---|---|---|---|
| | | 0.75 | 1.00 | 1.26 |
| 1 | A,B,C | 5.199 | 5.292 | 5.175 |
| 2 | A,B,B | 5.175 | 5.280 | 5.164 |
| 3 | A | 4.361 | 4.536 | 4.652 |
| 4 | B | 4.536 | 4.652 | 4.768 |
| 5 | C | 4.768 | 5.117 | 5.117 |

As shown in Table 3 and FIG. 7, the water spreading characteristics of the heat transfer tubes of the samples Nos. 1 and 2 were superior to those of the comparative examples Nos. 3, 4, and 6. As shown in Table 4 and FIGS. 8 and 9, the overall heat transfer coefficients of the samples Nos. 1 and 2 were superior to that of the comparative example No. 5 while the water spreading characteristics of the samples Nos. 1 and 2 ware almost the same as that of the comparative example No. 5. In particular, when the refrigerant flow rate (0.75 kg/m/min) was small, the overall heat transfer coefficients of the samples Nos. 1 and 2 were higher than that of the comparative example No. 5.

In this experiment, the liquid amount (2 ml) for dripping is very small. Therefore, when a shape of an external surface has excellent water spreading characteristics, the wetting and flow length on the tube upper portion (near the measurement points 1 and 2) is large, and thereby the liquid amount for wetting and flowing over the tube lower portion (measurement points 3 to 5) becomes small. As a result, the wetting and flow length on the tube lower portion becomes short.

As shown in Table 3, the wetting and flow lengths of the samples and comparative examples being compared with each other, it is clear that the wetting and flow lengths of the samples are larger. From these data, water spreading characteristics dramatically improve according to the present invention.

Exemplary Embodiment 2

Figure 10:
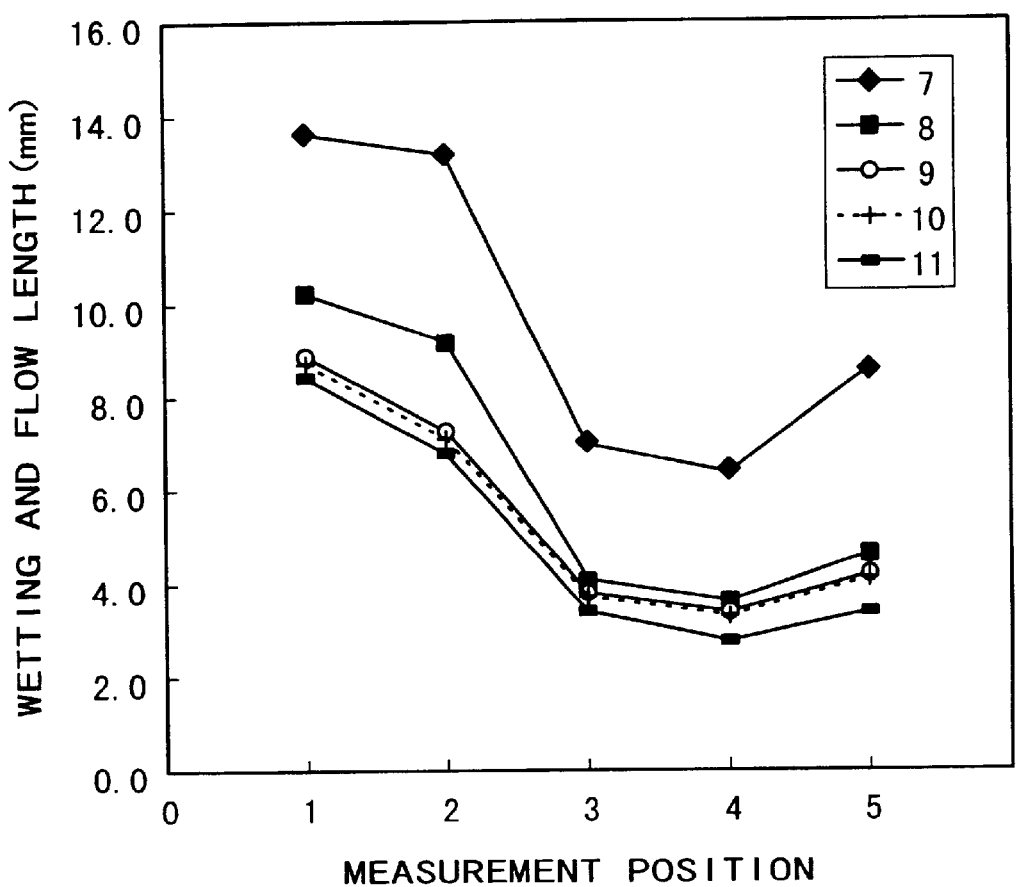
FIG. 10 is a graph that shows the relationship between the external shape and water spreading characteristics of the heat transfer tube, where the horizontal scale label indicates the measurement points and the vertical scale label indicates the water spreading characteristics.

Five different heat transfer tubes each having three different types of spirally arranged projections on its external surface were used, these three different types of the arranged projections respectively having different heights and pitches. Table 5 shows external diameters of these tubes, the projection heights, and pitches (pitches) in the spiral direction between the adjacent projections. The water spreading characteristics of the heat transfer tubes of Table 5 were evaluated. Table 6 and FIG. 10 show the result of the evaluation. FIG. 10 is a chart showing the relationship between the shapes and water spreading characteristics of the heat transfer tubes, where the horizontal scale label indicates measurement points and the vertical scale label indicates water spreading characteristics. A wall thickness of the heat transfer tubes was 0.54 mm, a pitch in the tube axis direction between the adjacent projection groups was 0.97 mm, a height of the ridge was 0.30 mm, and a lead angle of the ridge was 43 degrees.

TABLE 5

| | Example | Comparative example | | | |
|---|---|---|---|---|---|
| No. | 7 | 8 | 9 | 10 | 11 |
| External Diameter (mm) | 15.4 | 15.5 | 15.3 | 15.3 | 15.3 |
| Projection Height | | | | | |
| h1 | 0.39 | 0.24 | 0.51 | 0.49 | 0.49 |
| h2 | 0.36 | 0.17 | 0.43 | 0.42 | 0.42 |
| h3 | 0.29 | 0.09 | 0.36 | 0.35 | 0.35 |
| Pitch | 0.49–0.71 | 0.37–0.61 | 0.50–0.74 | 0.34–0.58 | 0.72–0.96 |

TABLE 6

| Measurement point | No. | | | | |
|---|---|---|---|---|---|
| | 7 | 8 | 9 | 10 | 11 |
| 1 | 13.6 | 10.1 | 8.8 | 8.7 | 8.4 |
| 2 | 13.2 | 9.1 | 7.2 | 7.0 | 6.7 |
| 3 | 7.0 | 4.0 | 3.8 | 3.7 | 3.4 |
| 4 | 6.4 | 3.5 | 3.2 | 3.1 | 2.7 |
| 5 | 8.5 | 4.5 | 4.1 | 4.0 | 3.4 |
| Average Value | 9.7 | 6.2 | 5.4 | 5.3 | 4.9 |

In an example No. 7 shown in Tables 5 and 6 and FIG. 10, since a height of the projections was in the range of 0.1 to 0.5 mm and a pitch between the projections was in the range of 0.35 to 0.95mm, the water spreading characteristics were excellent. Otherwise, in an example No. 8, since a height h3 was low, 0.09 mm, the water spreading characteristics were inferior to those of the example No. 7. In an example No. 9, since projection height h1 was high, 0.51 mm, the water spreading characteristics were inferior to those of the example No. 7. In an example No. 10, since a minimum value of the pitch between the projections was small, 0.34 mm, the water spreading characteristics were inferior to those of the example No. 7. In an example No. 11, since a maximum value of the pitch of the projections was large, 0.96 mm, the water spreading characteristics were inferior to those of the example No. 7. In the example No. 7, the water spreading characteristics especially at the measurement point 5 of FIG. 6 was superior to those of the examples Nos. 8 to 11. In the example No. 7, refrigerant flows all over the tube external surface, efficiently contributing to a heat exchange and resulting in high heat transfer ability. Otherwise, in the examples Nos. 8 to 11, the water spreading characteristics were inferior to those of the example 7, and thus part of the tube external surface is dried and do not contribute to a heat exchange.

Exemplary Embodiment 3

Figure 11:
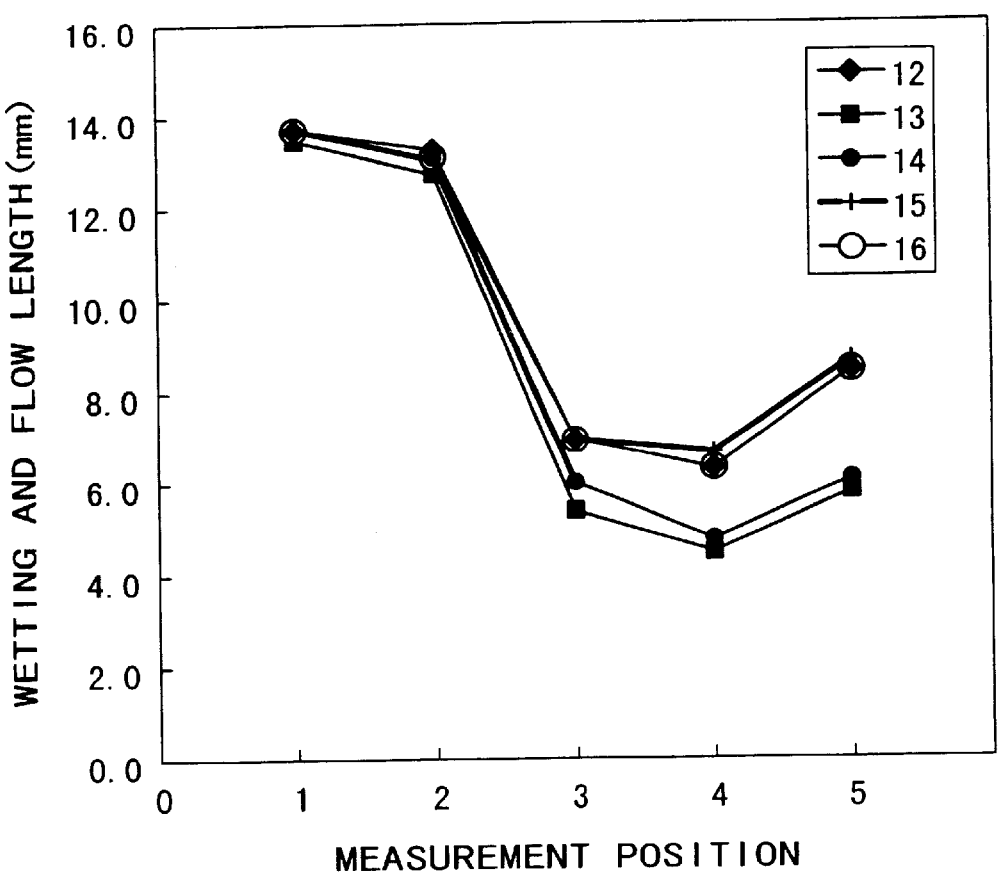
FIG. 11 is a graph that shows the relationship between the external shape and water spreading characteristics of the heat transfer tube, where the horizontal scale label indicates the measurement points and the vertical scale label indicates the water spreading characteristics.

Five different heat transfer tubes each having three different types of spirally arranged projections on its external surfaces were used, the five heat transfer tubes respectively having different pitches (arrangement pitches) between the projection groups in the tube axis direction. Water spreading characteristics of these heat transfer tubes were evaluated. Tables 7-1 and 7-2 and FIG. 11 show the result of the evaluation. FIG. 11 is a diagram showing the relationship between the shapes of the tube external surfaces and the water spreading characteristics, where the horizontal scale label indicates the measurement points and the vertical scale label indicates the water spreading characteristics. An external diameter of these raw tubes before machined was 16 mm, and an external diameter of these tubes after machined was 15.4 mm, and the tube thickness was 0.54 mm. Pitches for the projection arrangement were 0.49 mm, 0.60 mm, and 0.71 mm, respectively. Heights of the three different projections were 0.39 mm, 0.36 mm, 0.29 mm, respectively. A height of the ridge was 0.30 mm, a lead angle of the ridge was 43 degrees.

TABLE 7-1

| No. | Example 12 | Comparative example 13 | 14 | 15 | 16 |
|---|---|---|---|---|---|
| Arrangement Pitch | 0.97 | 0.71 | 1.13 | 1.00 | 0.81 |

TABLE 7-2

| Measurement point | No. 12 | 13 | 14 | 15 | 16 |
|---|---|---|---|---|---|
| 1 | 13.6 | 13.5 | 13.7 | 13.6 | 13.7 |
| 2 | 13.2 | 12.8 | 13.2 | 13.3 | 13.1 |
| 3 | 7.0 | 5.4 | 6.0 | 7.1 | 6.9 |
| 4 | 6.4 | 4.5 | 4.7 | 6.6 | 6.3 |
| 5 | 8.5 | 5.8 | 6.1 | 8.6 | 8.5 |
| Average Value | 9.7 | 8.4 | 8.7 | 9.8 | 9.7 |

As shown in Table 7 and FIG. 11, in examples 12, 15, and 16, since the pitches between the groups were over 0.72 mm and under 1.12 mm, the water spreading characteristics were superior to those of examples 13 and 14. In the examples 13 and 14, since the water spreading characteristics were relatively inferior to those of the examples 12, 15, and 16, refrigerant film thickness became relatively thick, lowering heat transfer ability relatively.

Exemplary Embodiment 4

Figure 12:
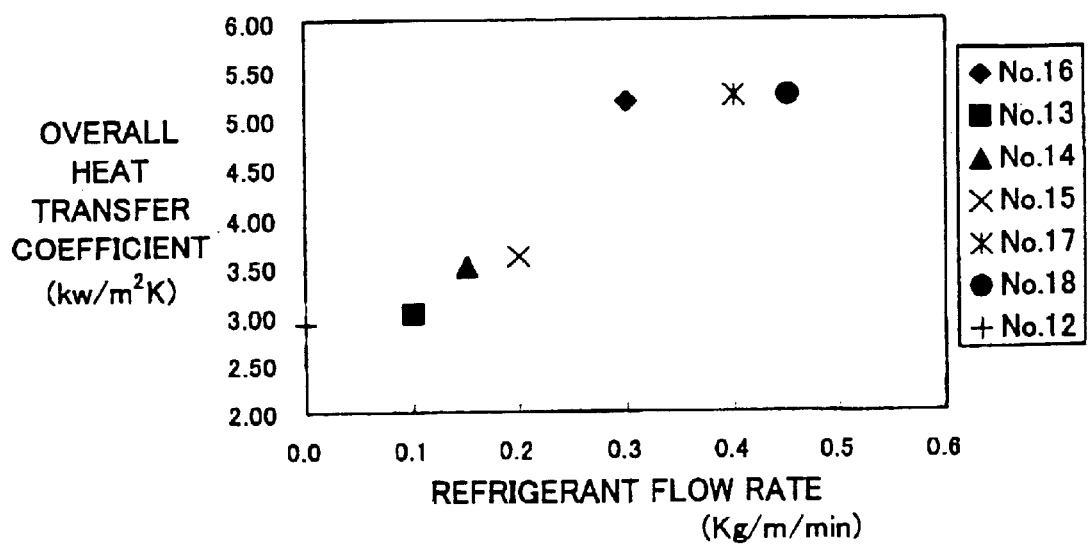
FIG. 12 is a graph that shows the relationship between the ridge height and overall heat transfer coefficient of the heat transfer tube, where the horizontal scale label indicates the ridge height and the vertical scale label indicates the overall heat transfer coefficient.

Seven different heat transfer tubes each having three different spirally arranged projections on its external surface were used, ridge heights on the tube internal surfaces of the seven heat transfer tubes were different from one another. Overall heat transfer coefficients of these heat transfer tubes and the pressure drops were evaluated. Table 8 and FIG. 12 show the result of the evaluation. FIG. 12 is a graph showing the relationship between the ridge heights and the overall heat transfer coefficients, where the horizontal scale label indicates the ridge heights and the vertical scale label indicates the overall heat transfer coefficients. An external diameter of these raw tubes before machined was 16 mm, and an external diameter of these tubes after grooved was 15.4 mm, the tube wall thickness was 0.54 mm. A pitch in the tube axis direction between the adjacent projection groups was 0.97 mm. Pitches in the spiral direction between the adjacent projections were 0.49 mm, 0.60 mm, and 0.71 mm, respectively. Heights of the projections were 0.39 mm, 0.36 mm, 0.29 mm, respectively. A lead angle of the ridge was 43 degrees. A chilled water velocity is 1.5 m/s.

TABLE 8

| No. | Ridge Height (mm) | Overall Heat Transfer Coefficient (kw/m²k) | Pressure drop (kPa/m) |
|---|---|---|---|
| Comparative Example | | | |
| 12 | 0.00 | 2.908 | 1.95 |
| Example | | | |
| 13 | 0.10 | 3.024 | 2.10 |
| 14 | 0.15 | 3.489 | — |
| 15 | 0.20 | 3.605 | 2.43 |
| 16 | 0.30 | 5.175 | 3.20 |
| 17 | 0.40 | 5.234 | 3.75 |
| 18 | 0.45 | 5.234 | — |
| 19 | 0.50 | — | 4.10 |

As shown in Table 8 and FIG. 12, the higher the ridge height was, the more overall heat transfer coefficient increased. In particular, when the ridge height was equal to or over about 0.15 mm, the overall heat transfer coefficient largely increased. When the ridge height was about 0.4 mm, the increase of the overall heat transfer coefficient was saturated. Otherwise, the higher the ridge height was, the more the pressure drop increased. In particular, when the ridge height was equal to or over 0.45 mm, the pressure drop of chilled water extremely increased.

Exemplary Embodiment 5

Figure 13:
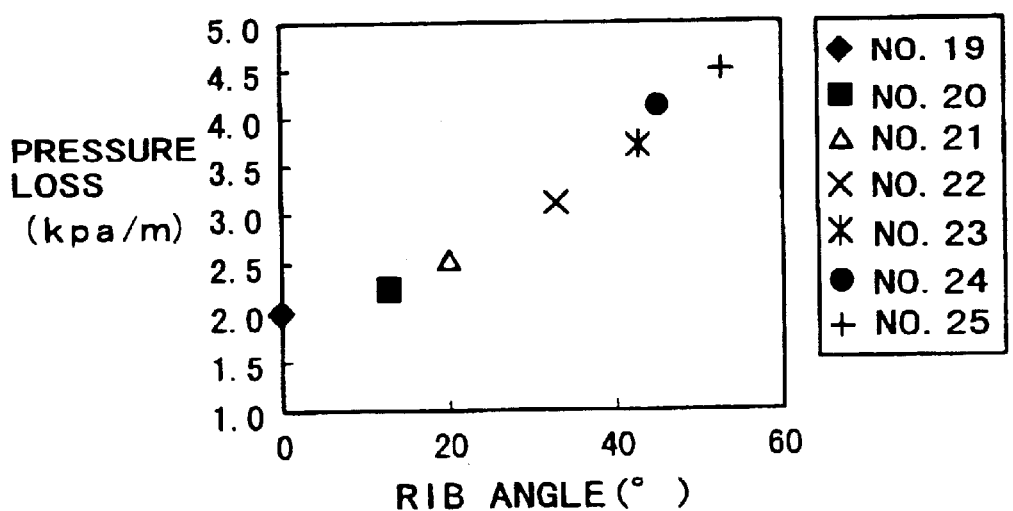
FIG. 13 is a graph that shows the relationship between the ridge lead angle and pressure drop of chilled water flowing through the heat transfer tube, where the horizontal scale label indicates the ridge lead angle and the vertical scale label indicates the pressure drop of chilled water.

Seven different heat transfer tubes each having three different spiral projection groups on its external surface were used, the seven heat transfer tubes respectively having different angles (ridge lead angles) between the extending direction of the ridges on their internal surface and the tube axis direction. Pressure drop of chilled water inside the heat transfer tubes were measured. Table 9 and FIG. 13 show the result of the measurement. FIG. 13 is a graph showing the relationship between the tube ridge lead angles of the tubes and the pressure drop of chilled water, where the horizontal scale label indicates the ridge lead angles and the vertical scale label indicates the pressure drop of chilled water. An external diameter of these raw tubes before machined was 16 mm, an external diameter of these tubes after machined was 15.4 mm, and the tube wall thickness was 0.45 mm. The pitch in the tube axis direction between the adjacent projection groups was 0.97 mm, a pitch in the spiral direction between the adjacent projections was 0.60 mm, the height of the projection was 0.30 mm, and the height of the ridges was 0.20 mm.

TABLE 9

| Example No. | Ridge lead angle (degree) | Pressure drop (kPa/m) |
|---|---|---|
| 20 | 0 | 1.95 |
| 21 | 13 | 2.23 |
| 22 | 20 | 2.55 |
| 23 | 33 | 3.10 |
| 24 | 43 | 3.75 |
| 25 | 46 | 4.10 |
| 26 | 53 | 4.55 |

As shown in Table 9 and FIG. 13, the more the ridge lead angle increased, the more the pressure drop of chilled water increased. In particular, when the ridge lead angle was over 45 degrees, the pressure drop extremely increased.

Otherwise, when the ridge lead angle was equal to or over 20 degrees, the heat transfer ability improved with the increase of the ridge lead angle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A falling film type heat transfer tube for exchanging heat between a liquid film formed by liquid dripping onto an external surface of the tube and a fluid flowing through the tube, comprising:
   a tube body;
   a plurality of separate projections formed on an external surface of the tube; and
   a ridge formed on an internal surface of the tube, the ridge having a convex shape and extending spirally; wherein said projections are divided into a plurality of projection groups; in each projection group, a plurality of uniformly shaped projections are arranged spirally so that pitches between adjacent projections are uniform; the longitudinal directions of said projection groups are in parallel to one another; and a shape of or pitch for said projections forming at least one projection group is different from shapes of or pitches for said projections forming other projection groups.

2. The falling film type heat transfer tube according to claim 1, wherein said projections of all said projection groups have truncated quadrilateral pyramid shapes or quadrilateral pyramid shapes.

3. The falling film type heat transfer tube according to claim 1, wherein the number of said projection groups is three.

4. The falling film type heat transfer tube according to claim 3, wherein said three projection groups comprise a first projection group having first projections, a second projection group having second projections, and a third projection group having third projections, the three projection groups being arranged in the tube axis direction in the mentioned order,
   wherein the height of said first projections is the same as that of said second projections, and higher than that of said third projections; and
   the pitch between said first projections is the same as the pitch between said second projections, and longer than the pitch between said third projections.

5. The falling film type heat transfer tube according to claim 3, wherein said three projection groups comprise a first projection group having first projections, a second projection group having second projections, and a third projection group having third projections, the three projection groups being arranged in the tube axis direction in the mentioned order,
   wherein the height of said first projections is the same as that of said second projections, and lower than that of said third projections; and
   the pitch between said first projections is the same as that between said second projections, and shorter than that between said third projections.

6. The falling film type heat transfer tube according to claim 3, wherein said three projection groups comprise a first projection group having first projections, a second projection group having second projections, and a third projection group having third projections, the three groups being arranged in the tube axis direction in the mentioned order,
   wherein the height of said first projections is higher than that of said second projections, and the height of said second projections is higher than that of said third projections.

7. The falling film type heat transfer tube according to claim 3, wherein said three projection groups comprises a first projection group comprised of first projections; a second projection group having second projections; and a third projection group having third projections, the three groups being arranged in the tube axis direction in the mentioned order,
   wherein the pitch between said first projections is longer than that between said second projections, and the pitch between said second projections is longer than that between said third projections.

8. The falling film type heat transfer tube according to claim 6, wherein said three projection groups comprise a first projection group having first projections, a second projection group having second projections, and a third projection group having third projections, the three groups being arranged in the tube axis direction in the mentioned order,
   wherein the pitch between said first projections is longer than that between said second projections, and the pitch between said second projections is longer than that between said third projections.

9. The falling film type heat transfer tube according to claim 1, wherein all pitches between said adjacent projections of one projection group are in the range from 0.35 to 0.95 mm.

10. The falling film type heat transfer tube according to claim 1, wherein all heights of said projections are in the range from 0.1 to 0.5 mm.

11. The falling film type heat transfer tube according to claim 1, wherein a pitch in the tube axis direction between said adjacent projection groups is in the range from 0.72 to 1.12 mm.

12. The falling film type heat transfer tube according to claim 1, wherein the height of said ridge is in the range from 0.15 to 0.45 mm.

13. The falling film type heat transfer tube according to claim 1, wherein an angle between the extending direction of said ridge and the tube axis direction ranges from 20 to 45 degrees.

14. A falling film type heat transfer tube for exchanging heat between a liquid film formed by liquid dripping onto an external surface of the tube and a fluid flowing through the tube, comprising:
   a tube body;
   a plurality of separate projections formed on an external surface of the tube; and
   a ridge formed on an internal surface of the tube, the ridge having a convex shape and extending spirally,
   wherein said projections are divided into a plurality of projection groups, each comprising a plurality of uniformly shaped projections arranged spirally so that pitches between adjacent projections are uniform, wherein longitudinal directions of said projection groups are parallel to one another, and wherein the surface tension for one of said projection groups is different from that of another projection group such that refrigerant flows from said one projection group to said another projection group.

15. A falling film type heat transfer tube for exchanging heat between a liquid film formed by liquid dripping onto an external surface of the tube and a fluid flowing through the tube, comprising:

a tube body;

a plurality of separate projections formed on an external surface of the tube; and a ridge formed on an internal surface of the tube, the ridge having a convex shape and extending spirally, wherein said projections are divided into a plurality of projection groups, each comprising a plurality of uniformly shaped projections arranged spirally so that pitches between adjacent projections are uniform, wherein longitudinal directions of said projection groups are parallel to one another, and wherein the surface tension for each of said projection groups is different from that of other projection groups such that refrigerant flows from one projection group to the other projection groups.

* * * * *